(12) United States Patent
Kawanaka et al.

(10) Patent No.: US 8,376,856 B2
(45) Date of Patent: Feb. 19, 2013

(54) MONITORING METHOD AND SYSTEM USING COLLECTIVE INTELLIGENCE AND RATING PROPAGATION IN VIRTUAL WORLD COMMUNITY

(75) Inventors: Shinya Kawanaka, Tokyo (JP); Toshiro Takase, Kanagawa-ken (JP); Naohiko Uramoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1417 days.

(21) Appl. No.: 11/962,973

(22) Filed: Dec. 21, 2007

(65) Prior Publication Data

US 2009/0163278 A1 Jun. 25, 2009

(51) Int. Cl.
*A63F 13/00* (2006.01)
(52) U.S. Cl. .......................................................... 463/40

(58) Field of Classification Search ........... 463/1, 40–42
See application file for complete search history.

*Primary Examiner* — Omkar Deodhar
*Assistant Examiner* — Eric M Thomas
(74) *Attorney, Agent, or Firm* — Scully, Scott, Murphy & Presser, P.C.; Gail H. Zarick, Esq.

(57) ABSTRACT

A method and system for monitoring and judging activities in a virtual world environment are disclosed. The method comprises a first user engaging in an activity in the virtual world environment, a witness witnessing the first activity and reporting the activity to a monitor as possibly malicious, and the monitor organizing a jury comprised of a plurality of jurors. The jurors view and judge the activity in the virtual world environment; and on the basis of this judging, defined benefits in the virtual world environment are awarded to the witness, monitor and jurors. The method may further comprise penalizing the first user in the virtual world environment. For instance, if the first user has friends in the virtual world environment, the penalizing may include penalizing these friends.

10 Claims, 5 Drawing Sheets

SYSTEM COMPONENT

FIG. 1
RELATIONSHIP AMONG USERS, GROUPS, AND OBJECTS

*FIG. 2*
SYSTEM COMPONENT

FIG. 3
SEQUENCE DIAGRAM

FIG. 4
TABLE LAYOUT

FIG. 5

MONITORING METHOD AND SYSTEM USING COLLECTIVE INTELLIGENCE AND RATING PROPAGATION IN VIRTUAL WORLD COMMUNITY

BACKGROUND OF THE INVENTION

1. Field of the Invention

This invention generally relates to transactions and activities in virtual world environments, and more specifically, the invention relates to methods and systems for monitoring and judging conduct in virtual world environments.

2. Background Art

Virtual world environments often include imaginary characters participating in fictional events, activities and transactions. There are educational and entertainment benefits in creating new and challenging ways to relate virtual world environments with real-world experiences.

In these days, virtual world (3D Internet) communities typified by Second Life are attracting attention. However, adult content (including avatars' clothes, and actions between avatars) and terrorism such as gunfights in such virtual world communities have become an issue. This is a big issue also for companies carrying on businesses in the virtual world communities. For example, if the aforementioned incident occurs in a virtual shop managed by a company, the company may lose its reputation.

Although being computerized environments, existing 3D Internets have a number of limitations. For example, it is difficult to automatically figure out if an avatar carries a gun or has inappropriate objects. Such detection depends on a matter of what kind of texture images are applied to the avatar, or how the avatar looks like. Also, it is difficult to monitor all the places all the time (if the virtual world community grows more) in virtual worlds. Existing virtual world providers, such as Second Life, provide a system for allowing a user to notify a malicious action to the service provider by email or other mechanisms. However, monitoring the entire virtual world around the clock is very expensive. Therefore, in most actual services, an incident such as terrorism cannot be prevented from occurring, or be solved in an early stage.

The 3D Internets have a number of characteristics that facilitate monitoring virtual activities. One such characteristic is that there are always some users (who live in different time zones) logging on. This means that users can be collected relatively easily at any time. Also, it is easy for users to move (teleport) from one place to another. In the existing communities, tags or rating values may be assigned to the users (avatars). However, a group of users who do malicious actions ca intentionally increase their rating values. Accordingly, such ratings cannot be trusted as a criterion of indicating correct evaluations.

Many users belong to plural groups. In many of the existing implemented communities, admittance into a building or an island is controlled on a group-by-group basis. Accordingly, users who do malicious actions often belong to a certain group (there is also a possibility that malicious actors frequently change the name of their group as a countermeasure, for example). An administrator of a community can easily find out what group a user belongs to, and what object a user possesses.

SUMMARY OF THE INVENTION

An object of this invention is to improve monitoring of activities in virtual world environments.

Another object of the present invention is to provide a technique for monitoring malicious actions in a virtual world by utilizing plural users' views as collective intelligence.

A further object of the invention is to allow members of a virtual world community to monitor one another, and to reduce malicious actions in the virtual world community by utilizing the voting of a large but unbiased number of members.

These and other objectives are attained with a method and system for monitoring and judging activities in a virtual world environment. The method comprises the steps of a first user engaging in an activity in the virtual world environment; a witness witnessing said first activity and reporting the activity to a monitor as possibly malicious; and said monitor organizing a jury comprised of a plurality of jurors. The jurors view and judge the activity in the virtual world environment; and on the basis of this judging, defined benefits in said virtual world environment are awarded to said witness, monitor and jurors.

In virtual world (3D Internet) communities, where users can easily perform malicious actions, such as, committing terrorism with a carried gun. However, it costs much for service providers of the communities to prevent such a behavior with an existing technology. The present invention provides a technique for allowing members of a virtual world community to monitor one another, and for reducing malicious actions by utilizing the voting of a large but unbiased number of members. In a virtual world, networks are configured of elements, such as users (avatars), objects and groups, in the relations of possession (user-object), and of affiliation (user-group). According to the present invention, a rating value is defined for each of these elements (users, objects, and groups). The rating value represents a level of reliability of them. Then, the rating values thus defined are propagated, and thereby the reliabilities in the virtual world are assigned elements scattered in the world. By placing more importance on a judgment made by users with high reliabilities, malicious actions can be promptly detected and prevented on a community basis.

Further benefits and advantages of the invention will become apparent from a consideration of the following detailed description, given with reference to the accompanying drawing, which specifies and shows preferred embodiments of the invention.

DETAILED DESCRIPTION OF THE PREFERRED EMBODIMENTS

Figure 1:
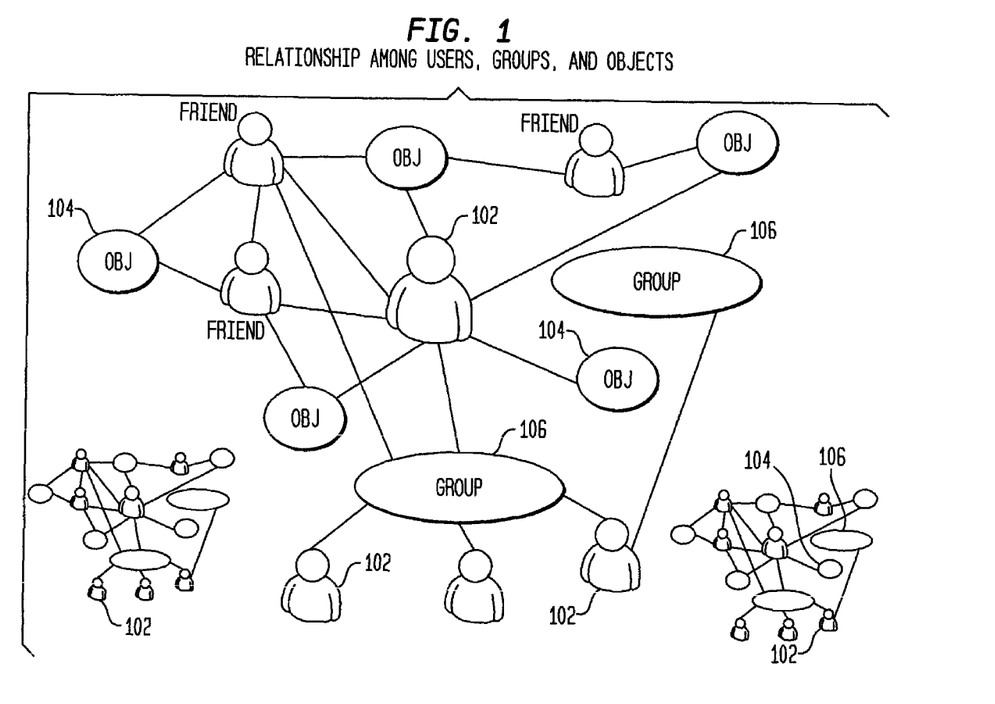
FIG. 1 illustrates a relationship among users, groups, and objects in a virtual world environment.

The present invention provides a method and system for monitoring behavior in a virtual world environment. FIG. 1 shows, as an example, a virtual world environment comprised of users 102, referred to as Avatars, objects 104 and groups 106. Each user may belong to one or more groups and may have one or more friends 110.

The preferred embodiment of the invention is comprised of a number of procedures including: notification of malicious action, selection of jurors, a calculation of rating value; voting; assignment of rating value; propagation of rating values; propagation of ratings by contact between Avatars or between objects; and surveillance by collective intelligence. Each of these procedures is discussed below in detail.

Notification of Malicious Action

When a malicious action such as a terrorist act is done, a user who witnessed the action invokes a collective intelligence avatar (service).

Selection of Jurors

The collective intelligence avatar appears to the place where the action happened, and then starts monitoring the place from this time (descriptions of the monitoring utilizing collective intelligence are discussed below). Concurrently, the collective intelligence avatar randomly selects N users (jurors) from among users who are logging in the virtual world community. The collective intelligence avatar then requests these N users to teleport to the place, and to vote on whether or not the action is malicious. In the selection, the candidates for jurors are not necessarily at that place. For the purpose of selecting N users who have no relations with the malicious action and who are not related with one another, the system (the provider administering the user information) automatically selects jurors Ji (i=1, . . . ,N) in accordance with the following conditions. Group(J) denotes a set of groups to which a jury J belongs. $\forall$ J, K Group(J) $\cap$ Group(K)=$\phi$ (null), that is, no two jurors belong to the same community. No juror is linked to any other jurors as friends within m (for example, 3) hops. There are no or few similarities in personal information, for example, physical residences, of the users.

By utilizing, as the collective intelligence, users logging in the virtual world, it is possible to judge, with the plural users' eyes, whether the action is malicious or not. In addition, it is also possible to deal with the action in real time. Since the users to be collected are randomly selected by the system from users who satisfy the above-described conditions, it is possible to eliminate biased and unfair judgments. The collective intelligence avatar selects jurors, and then sends an invitation for teleportation to each of these selected jurors. After that, the situation of the action, which has been monitored, is played back for the jurors who have teleported to the place in compliance with the invitation.

A rating value assigned to a user by past actions is used for automating the judgment on whether the action is malicious or not. The rating value used in the preferred embodiment of the present invention is given to each user by leveraging the collective intelligence of users who have no relationship with one another. For this reason, the rating value is resistant to attempts to skew the value by a malicious user groups.

Calculation of Rating Value

Before selecting jurors, the collective intelligence avatar calculates a total rating value A of the user u who is doing the malicious action. The total rating value A is the sum of the rating value of the avatar (user) itself, the rating value of an object possessed by the avatar, and the rating value of a group to which the avatar belongs. The greater the total rating value is, the higher reliability the user has.

$$A(u)=A_1(u)+A_2(u)+A_3(u)$$

$A_1(u)$: the rating value of the user u him/herself
$A_2(u)$: the sum of the rating values of elements in a set of objects possessed by the user u
$A_3(u)$: the sum of the rating values of elements in a set of groups to which the user u belongs.

The total rating value A may not be a simple linear sum, but each of these values may be weighted to obtain the total rating value A.

In the same manner, a total rating value A(t) of the informer is calculated. When A(t)−A(u)>M (M is a predetermined constant) is satisfied, the action is automatically judged to be unfair. This judgment is performed for the purpose of solving the case in an early stage, by placing more importance on the judgment of a user having a high rating value which is given to the user in accordance with a past informing act, an act as a juror, and the like. When the above expression is not satisfied, a voting process is carried out.

Voting

Voting is a process in which the user, who has teleported to the place as a juror, judges whether the action done at the place is malicious or not. The voting is done by indicting either Yes or No to a target action by a (maybe malicious) user. When the number of users who judge that the action is malicious by voting on Yes exceeds a predetermined threshold value K, the collective intelligence avatar requests the administrator of the virtual world to cause appropriate action against the user who is doing the malicious action. In addition, when the number of "Yes" votes exceeds the number of "No " votes even in the middle of the Voting, the collective intelligence avatar requests the administrator to delay the transmission of rendering information, so that the disputed action is interfered with.

Assignment of Rating Value

Whether the action was really malicious or not can be validated by manually examining the action after the occurrence of the incident. As a result of the evaluation, rating values are assigned to the involved users in the following manner.

A positive rating value is assigned to a user who carried out an eventually correct voting. In addition, a reward of the virtual currency or the like is given to the user. A positive rating value is assigned to a user who carried out a correct notification. In addition, a reward of the virtual currency or the like is given to the user. A negative rating value is assigned to the user who did the malicious action. A negative rating value is assigned to each of the objects possessed by the user who did the malicious action, and also to each of the groups to which the user belongs.

Propagation of Rating Values 1

Moreover, the rating values are propagated in the following manner. A negative rating value is assigned to a user possessing an object that is the same as, or similar to, one possessed by the user who did the malicious action. A negative rating value is assigned to each member of the groups to which the user did the malicious action belongs. A negative rating value is assigned to each member of the friend list of the user who did the malicious action.

Propagation of Rating Values 2

As a result of the assignment and the propagation of the rating values, when the absolute value of the rating value of one of the users exceeds a certain threshold value, the user has a significant influence on other users. In this case: a value proportional to the rating value of the user is assigned to each of the friends of the user. The decay of the value to be assigned is set in accordance with a predetermined decay curve. Moreover, when the rating value of a user assigned the value through the propagation exceeds the threshold value, the propagation is carried out again from the user as a starting point.

A user who intends to do a malicious action may frequently change his or her user ID in order to prevent a negative rating value from being assigned to him or her. However, even in such a case, it costs so much for the user to change his or her possessions (objects) for every time he or she changes his or her ID (for example, it is expensive to create a gun for every time). Accordingly, a rating value is assigned to an object, and is then reflected in a total rating value. On the other hand, information on a group is utilized for controlling accesses to places and buildings. Accordingly, by taking rating values to groups into consideration, it is possible to assign rating values to users in a wide range.

Propagation of Rating by Contact between Avatars or Between Objects

When a first avatar chats with a second avatar having a high (or low) rating value, or when a first avatar stays with a second avatar having a high (or low) rating value at the same location for a certain period of time, the rating value of the second avatar is propagated to the first avatar. In addition, when an object possessed by a certain user has a high (or low) rating value, the rating value is also propagated to other objects possessed by the user.

Surveillance by Collective Intelligence

In a virtual world, when plural avatars exist within a certain area, views (displayed by client programs of the users who are operating the corresponding avatars) are different from one another in accordance with the positions of the avatars. When a malicious action is done, the view from each of the avatars who are in the place where the malicious action is being done is recorded as an image or a movie. Then, the recorded image or movie is sent to the server side. In this manner, visual scenes at the site from various angles can be stored. This process is carried out in the following procedures.

The collective intelligence avatar appears at a place where a malicious action is being done, and then starts monitoring the place from this time. Concurrently, the collective intelligence avatar sends monitoring requests to avatars who are in the periphery of the place. The periphery referred to here is calculated on a scale of X meters in radius. On the protocol, this means that the request is sent from the server to the client program of the user who is operating each of the avatars. Upon reception of the request, the client program transmits back, to the server side, a series of snapshots, or a movie, which has been displayed on the screen.

An application example will be given hereinbelow. Specifically, monitoring requests are sent to avatars that are sampled by the server side for places where a malicious action is not done. By receiving the result of the monitoring from each of the corresponding clients, it is possible to carry out a wider-area monitoring (surveillance) without performing heavy processing at the server side.

Figure 2:
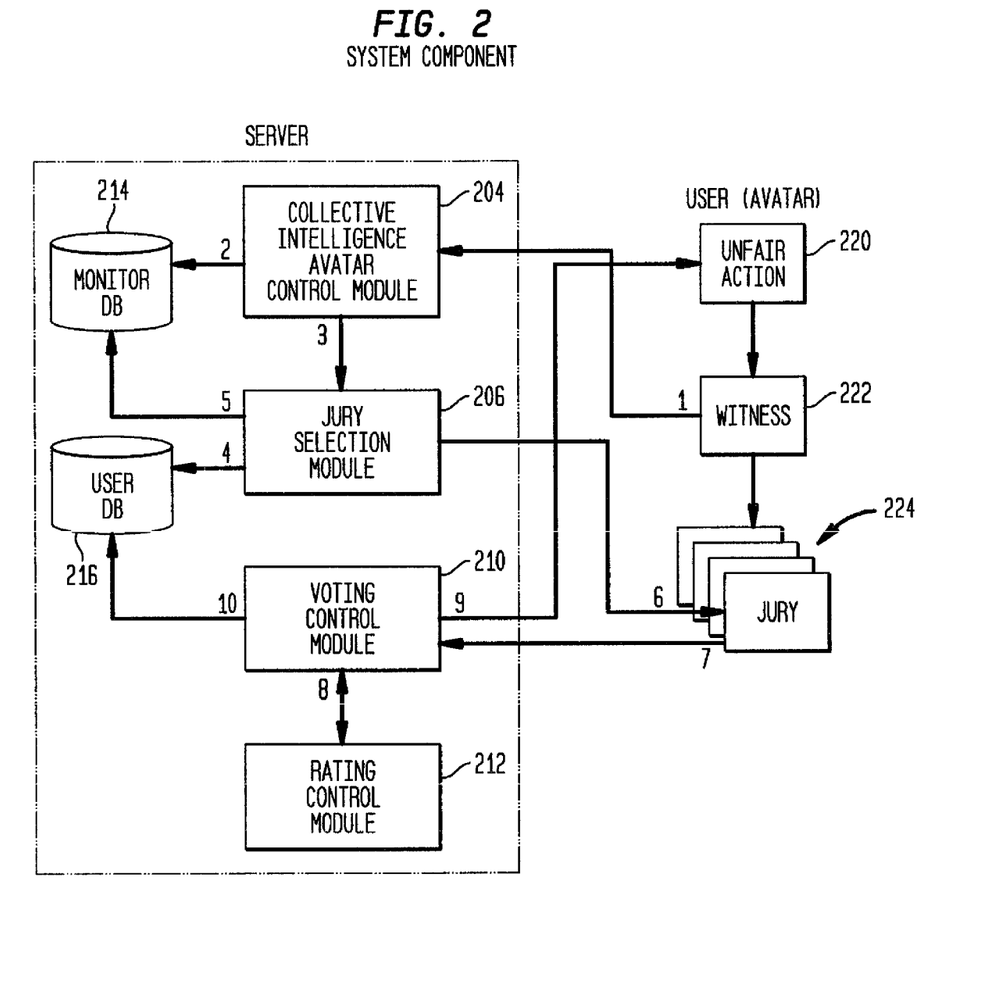
FIG. 2 shows the components of a system in accordance with an embodiment of the present invention.

FIG. 2 shows a configuration of the present invention. In this configuration, the server side includes collective intelligence avatar control module 204, jury selection module 206, voting control module 210, rating control module 212, monitor database 214 and user database 216. FIG. 2 also shows users 220, a witness 222 and jurors 224. The present invention can be achieved by adding components shown in FIG. 2 to a server environment provided by a virtual world provider (an authentication server or an engine for developing a virtual world and the like are known technologies, and are thus not illustrated). The clients corresponding to the respective users are shown on the right side of FIG. 2.

The collective intelligence avatar control module receives a notification from a user, then starts up the collective intelligence avatar, and also performs the overall control. The jury selection module accesses a user database, and selects appropriate jurors. The Voting control module communicates with a rating control module, and manages the Voting of the jurors. In the monitor DB, an action that appears to be malicious is stored. The user DB is used for managing possessions, groups, personal information sets, rating values, and the like.

The numbers 1-10 in FIG. 2 indicate the order and the flow of the processing. The procedures of the processing will be described below. The process begins when a malicious actor does some action. At step 1, a user (witness) who witnesses the action notifies the server of the fact that the malicious action is being done. At step 2, the collective intelligence avatar is started up, and then monitoring of the place where the malicious action is being done. The collective intelligence avatar successively stores the result of the monitoring in the monitor DB.

At step 3, the jury selection module is invoked. At steps 4, 5 and 6, the jury selection module selects jurors in accordance with information obtained from the user DB, and then notifies the selected jurors. The jury selection module further sends the result of the monitoring of the place to the users who have become the jurors. At step 7, the jurors carry out the Voting, and then send the result of the Voting to the voting control module. At steps 8 and 9, the voting control module receives rating information from the rating control module. Then, in accordance with the result of the Voting, the voting control module executes processing on the user who does the malicious action. At step 10, rating information on the users, the related objects, and the related groups is updated, and the result of the update is then sent to the user DB.

Figure 3:
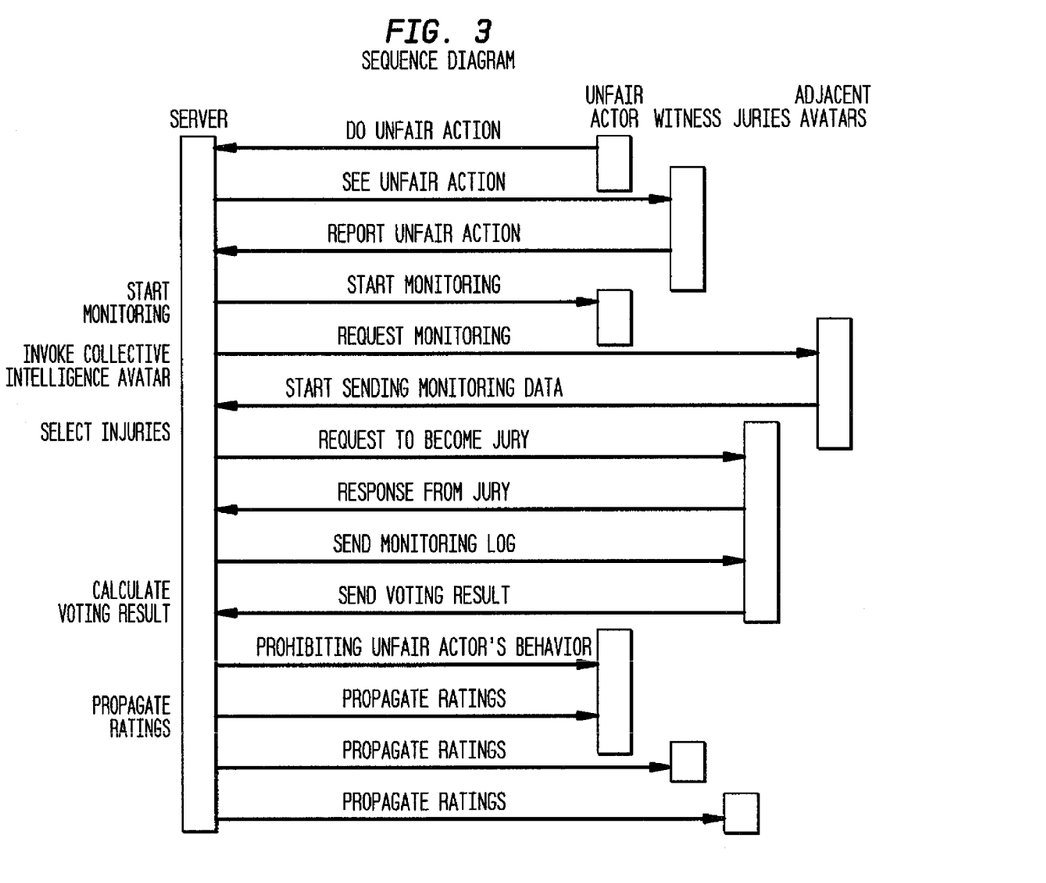
FIG. 3 shows a sequence diagram illustrating the procedure, embodying this invention, between the administrative server side and the client side.

FIG. 3 shows a sequence diagram of the above-described processing, between the administrative server side and the client side (the malicious actor, the witness, the jurors, and the adjacent avatars).

Figure 4:
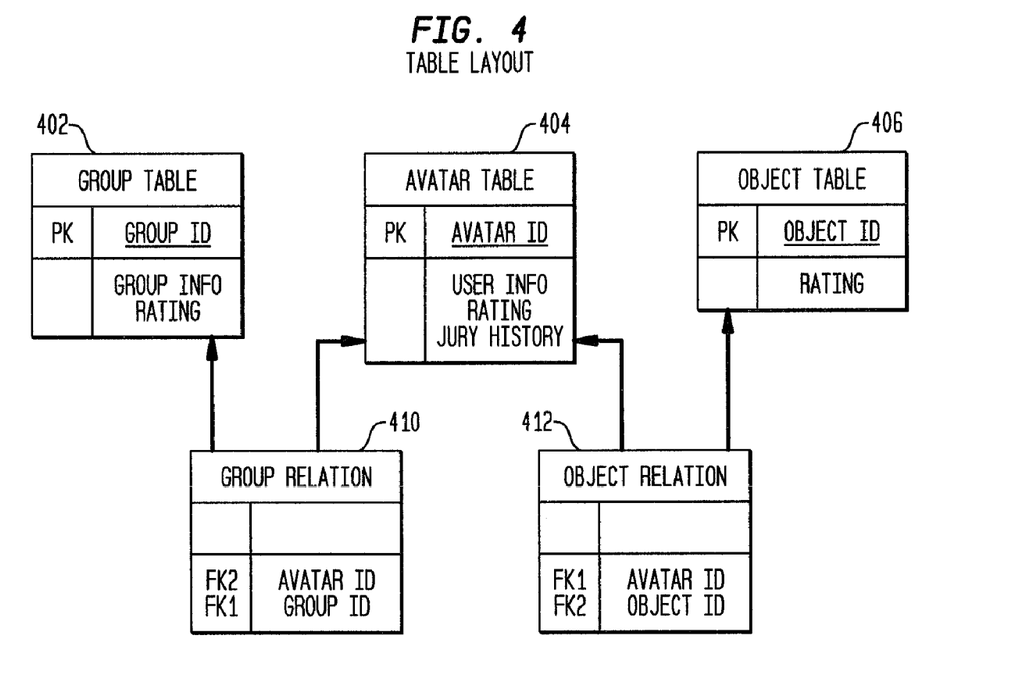
FIG. 4 shows an example of a layout of databases regarding the users, the groups and the possessed objects in a virtual world environment.

In addition, FIG. 4 shows an example of a layout of databases regarding the users (avatars), the groups, and the possessed objects. In particular, FIG. 4 shows a Group Table 402, an Avatar Table 404 and an Object Table 406. A Group Relation 410 relates the Avatar Table to the Group Table, and an Object Relationship 410 relates the Avatar Table to the Object Table.

In the selection of jurors, used are user information, a rating value, a jury history and the like in an avatar table. The user information includes attribute information in the real world (including an address, an age, gender and the like), which is not described in detail here. In addition, columns for rating values are prepared for each avatar, each object, and each group. The values in the columns are updated by the propagation of rating values.

Figure 5:
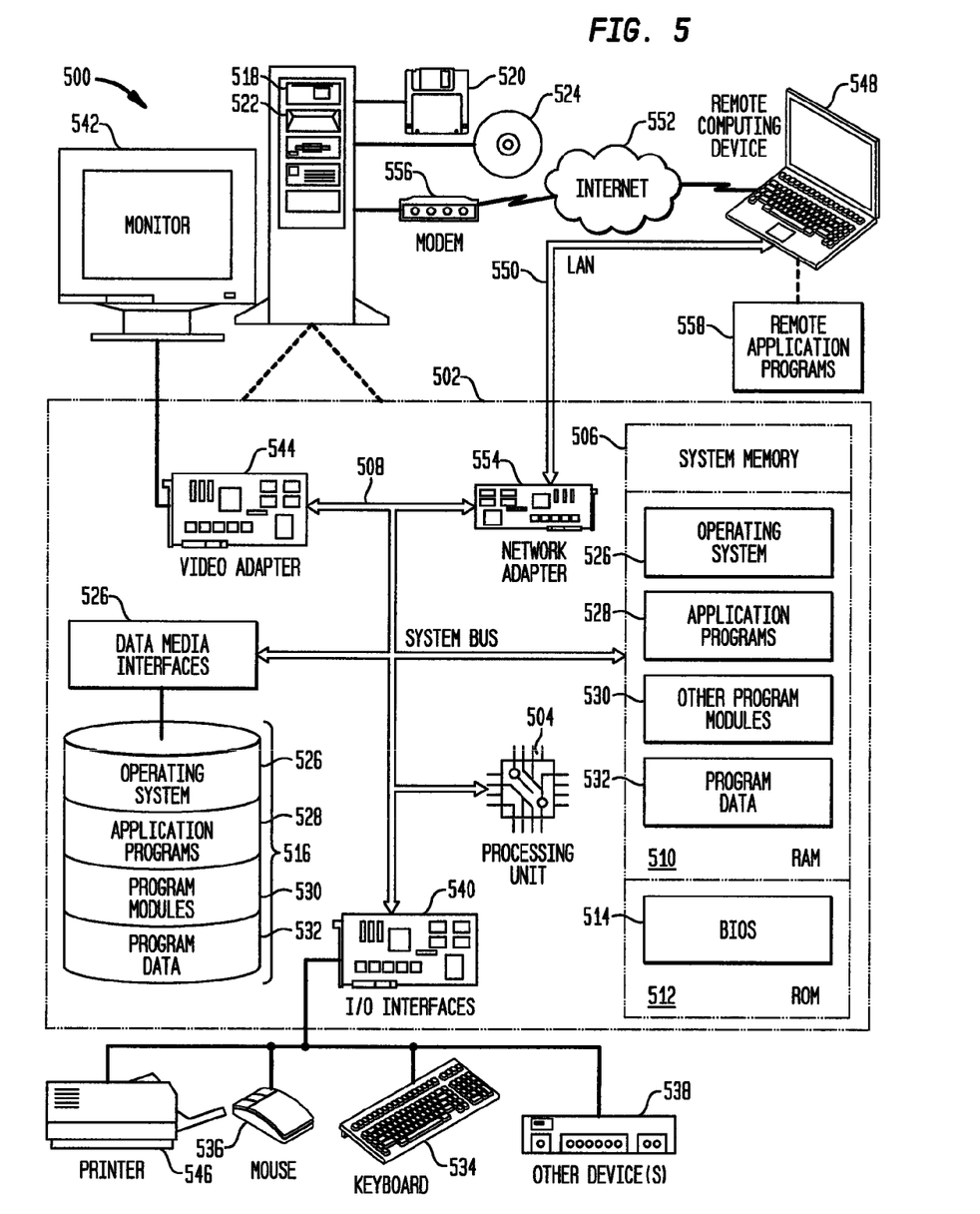
FIG. 5 depicts a general computing environment that, as an example, may be used to practice this invention.

FIG. 5 illustrates a general computer environment 500 that can be used to implement the virtual world monitoring and voting techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk "), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for monitoring and judging activities in a virtual world environment, the method comprising the steps of:
    a first user engaging in an activity in the virtual world environment;
    a witness witnessing said first activity and reporting the activity to a monitor as possibly malicious;
    said monitor organizing a jury comprised of a plurality of jurors;
    said jurors viewing and judging said activity in the virtual world environment; and
    on the basis of said judging, awarding defined benefits in said virtual world environment to said witness, monitor and jurors.

2. A method according to claim 1, comprising the further step of on the basis of said judging, penalizing the first user in the virtual world environment.

3. A method according to claim 2, wherein the first user has friends in said virtual world environment, and the penalizing step includes the step of penalizing said friends.

4. A method according to claim 2, wherein the first user belongs to one or more groups in the virtual world environment, each of said one or more groups including a plurality of group members, and the penalizing step includes the step of penalizing said group members.

5. A method according to claim 1, wherein each of the jurors belongs to one or more groups in the virtual world environment, and no two of the jurors belong to the same group.

6. A method according to claim 1, comprising the further steps of:
    calculating a first rating value for the first user;
    calculating a second rating value for the witness; and
    judging said activity to be unfair if the rating value for the witness exceeds the rating value for said first person by a given amount.

7. A method according to claim 6, wherein the first user has an initial value and the first user possesses a set of objects in the virtual world environment, each of said objects having an object value, and wherein the step of calculating the first rating value includes the step of summing said initial value and all of said object values.

8. A method according to claim 7, wherein the first user belongs to one or more groups in the virtual world environment, each of said one or more groups having a group value, and the summing step includes the step of summing said initial value, all of said object values and said group values.

9. A method according to claim 1, wherein said activity occurs in a defined place in the virtual world environment, and the step of organizing the jury includes the step of, after the jurors are selected, inviting the jurors to teleport in the virtual world environment to said defined place.

10. A method according to claim 1, wherein the step of viewing and judging the activity includes the steps of:
    each of the jurors viewing the activity in real time and voting on whether the activity is malicious; and
    judging the activity to be malicious after a given number of jurors have voted the activity as malicious.

* * * * *